Figure 1:
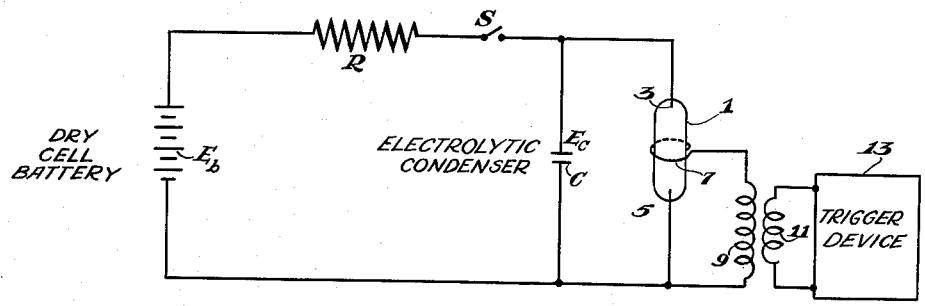

May 9, 1961     H. E. EDGERTON     2,983,850
CONDENSER-CHARGING CIRCUIT FOR FLASH-PRODUCING APPARATUS
Filed Sept. 3, 1952

INVENTOR.
HAROLD E. EDGERTON
BY Rines and Rines
ATTORNEYS

United States Patent Office 2,983,850
Patented May 9, 1961

2,983,850
CONDENSER-CHARGING CIRCUIT FOR FLASH-PRODUCING APPARATUS

Harold E. Edgerton, Belmont, Mass., assignor to Edgerton, Germeshausen & Grier, Inc., Boston, Mass., a corporation of Massachusetts Filed Sept. 3, 1952, Ser. No. 307,677

3 Claims. (Cl. 315—241)

The present invention relates to condenser-charging methods and circuits adapted for flash-producing apparatus and the like, and more particularly to a method of and system for improving the performance of portable electronic flash-producing equipment.

Great emphasis has been laid in recent years upon the rendering portable of electronic flash-producing equipment for such purposes as high-speed photography. To achieve such portability, dry-cell batteries have been utilized as the source of energy. The dry-cell battery, however, has rather poor regulation characteristics due to deleterious chemical effects that proceed with use of the battery. If the load connected to the dry-cell battery is removed, moreover, the terminal voltage thereof tends to rise toward the initial open-circuit voltage value. Such characteristics are particularly disadvantageous for operating electronic flash-producing units. After several flashes have been produced, for example, the voltage being supplied by the dry-cell battery will be found to drop rather suddenly, and then to continue to drop more gradually with continued use for a period known as the main life period of the battery, until a region is reached that is either of such low voltage that the flash lamp can not be discharged, or the light produced each flash of the flash lamp is so small that it is not satisfactory. This is because the light energy produced during the flash of a flash lamp depends upon the electrical energy which is supplied to the lamp by the flash-condenser that discharges through the lamp, the relationship being given by the following expression:

$$\text{Light energy in flash} = \frac{CE^2}{2} \text{ watt-seconds,}$$

where E is the voltage across the flash-condenser and C is the capacitance of the condenser in farads.

The flash condenser is often of the electrolytic type. It is usually important that the electrolytic condenser be not charged to a voltage larger than the rated value across its terminals. Most designers of flash equipment, therefore, select a dry-cell battery for charging the condenser of value equal to or less than the maximum tolerable voltage of the electrolytic condenser. When the equipment begins to function, however, the before-mentioned sudden drop in voltage of the dry-cell battery occurs. The energy-per-flash produced by the flash lamp, therefore, is reduced by the ratio of the square of the dropped and initial voltages of the battery. Such performance is not desirable since the light-per-flash is smaller than it should be for the major portion of the useful flashes that are produced by the battery during its main life period. The electrolytic condenser, furthermore, is not fully used since the voltage to which it charges is lower than can actually be tolerated.

An object of the present invention is to provide a new and improved method of and circuit for charging such an electrolytic condenser that permits the electrolytic condenser to be more fully used and that effectively increases the life of the dry-cell battery for useful flash-producing purposes.

Other and further objects will be explained hereinafter and will be more particularly pointed out in the appended claims.

Figure 2:
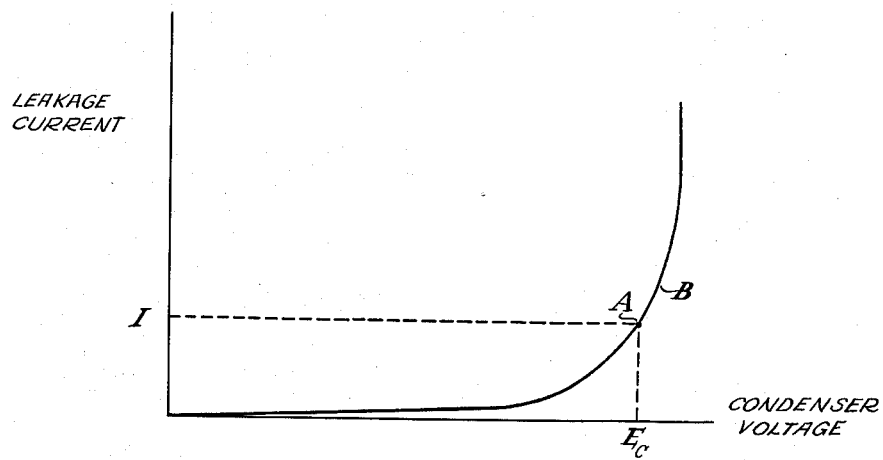

The invention will now be more fully described in connection with the accompanying drawings, Fig. 1 of which is a schematic circuit diagram of a flash lamp operating with a charging circuit embodying an electrolytic condenser and designed in accordance with a preferred embodiment of the present invention; and Fig. 2 is a graph illustrating the leakage-current characteristics of the electrolytic condenser.

An electrolytic condenser C is shown connected in series with a dry-cell battery $E_b$ and a resistor R in a circuit that may be closed by a switch S. The condenser C is connected between the principal electrodes 3 and 5 of a conventional flash lamp 1. The flash lamp 1 is provided with an external triggering electrode 7. Between the triggering electrode 7 and the principal electrode 5 is connected a secondary winding 9 of a trigger transformer the primary 11 of which is energized by any desired conventional trigger device 13. The energization of the secondary winding 9 causes the condenser C to discharge its voltage between the principal electrodes 3 and 5 to produce a flash of light that is emitted by the tube 1. In the previously mentioned prior-art systems, the value of the direct-current voltage $E_b$ of the battery is adjusted so that it does not exceed the maximum tolerable voltage $E_c$ of the electrolytic condenser C, producing the disadvantages before-described. In accordance with the present invention, on the other hand, the value of the resistor R is selected so that, in conjunction with the non-linear leakage current characteristic of the electrolytic condenser C, it permits the use of a battery of voltage $E_b$ considerably larger than the maximum tolerable voltage $E_c$ of the electrolytic condenser C.

The typical leakage-current characteristic curve of an electrolytic condenser C is plotted in Fig. 2 as a function of the condenser voltage, the leakage current being indicated along the ordinate, and the condenser voltage, along the abscissa. The characteristic illustrated may vary somewhat depending upon the temperature, the condition of the electrolytic film in the condenser, the size and type of the condenser, and other variables; but, in general, the characteristic corresponds to that illustrated in Fig. 2. It will be noted that the characteristic curve rises sharply in the region B to the right of the point A, which point corresponds to the maximum tolerable voltage $E_c$ of the condenser. This sharply rising non-linear characteristic is most valuable in tending to regulate the final voltage appearing across the condenser C when a proper resistor-battery combination is utilized. The series resistor R is made of such value that when the dry-cell battery has its full voltage value during its initial period of operation, the voltage drop across the resistor R caused by the leakage current I through the electrolytic capacitor C, when charged, will decrease the voltage across the charged condenser C to the maximum tolerable voltage $E_c$ of the condenser. It is thus evident that a dry-cell battery can now be used that, unlike prior-art systems, is of initial voltage greater than the maximum tolerable voltage $E_c$ of the electrolytic condenser, and that the full use of the voltage-storing capacity of the electrolytic condenser C is utilized. As the value of the dry-cell battery voltage rapidly drops during the initial period of use, as before mentioned, the leakage current of the condenser C also rapidly drops downwardly, to the left, along the characteristic B. The resistance R then has produced across it a decreased voltage drop resulting from the decreased leakage current through the condenser C. There will appear across the condenser C, therefore, a voltage equal to the difference between the lesser battery voltage and the lesser leakage-current-produced voltage across the resistor R, and the value of the condenser voltage will, therefore, still remain high.

This phenomenon thus tends to produce a type of regulatory action in connection with the voltage across the condenser C. The conditions that must be satisfied to produce this effect are given by substantially the following relation:

$$R = \frac{E_b - E_c}{I}$$

where $E_b$ is the open-circuited initial voltage of the dry-cell battery with the switch S open, as shown, $E_c$ is the maximum tolerable voltage of the electrolytic condenser C, and I is the leakage current produced in the circuit when the condenser is fully charged. Under such circumstances, the non-linear leakage current characteristic of the electrolytic capacitor will cooperate with the resistor R, of the above-mentioned value, to produce these desirable results. Not only is the use of a dry-cell battery permitted that is of voltage value greater than the maximum tolerable voltage $E_c$ of the condenser C, thus effectively extending the useful life of the dry-cell battery, but more full use is made of the voltage-carrying capacity of the condenser C by maintaining the voltage there-across in the neighborhood of the maximum tolerable condenser voltage in response to the regulatory action on the voltage produced thereacross, thus maintaining at a high level the light-flash energy produced by the flash lamp 1 over the main life period of the battery.

As an illustration, let it be assumed that $E_c$, the maximum tolerable voltage of the condenser, is 470 volts. If the open-circuit initial voltage of the dry-cell battery is 540 volts, then with 10 milliamperes of leakage current I, the resistor R should have a value of substantially 7000 ohms in order to produce the desired end. If the value of R is made too small, of course, then the condenser C will be over-volted and destroyed. If, on the other hand, the value of R is made too large, the battery voltage will have to be much larger than the maximum tolerable voltage of the condenser and the time required for charging the condenser C will become undesirably long. A somewhat smaller resistance R than the above-calculated resistance can, in practice, be used, since the battery itself has internal resistance and the large initial surge to charge the condenser tends, itself, to reduce the initial voltage of the battery. It might be more precisely stated, therefore, that the total resistance of the closed charging circuit should be substantially equal to the difference between the voltage of the direct-current source and the maximum tolerable voltage of the electrolytic condenser divided by the continuous leakage current through the condenser when charged.

It is to be understood that the present invention, while particularly adapted to flash-producing systems, is also adapted for more general use wherever it is desired to maintain a regulatory action upon the voltage produced by an electrolytic condenser and where dry-cell batteries and the like must be employed as the source of energy for charging the condenser. The phrase "dry-cell batteries and the like," just mentioned, sometimes herein referred to just as "dry-cell battery," is intended to describe generically this class of batteries having the poor voltage regulation characteristics previously described. Modifications will occur to those skilled in the art and all such are considered to fall within the spirit and scope of the invention as defined in the appended claims.

What is claimed is:

1. A portable electric system having, in combination, a flash-producing electric gaseous discharge device, an electrolytic condenser for storing voltage to produce a discharge through the discharge device, a charging circuit for the condenser comprising a dry-cell battery direct-current source of initial voltage greater than the maximum tolerable voltage of the condenser and of poor voltage regulation characteristics, a resistor, an open circuit connecting direct-current source, the resistor and the condenser in series, means for closing the circuit to charge the condenser, the total resistance of the closed circuit being substantially equal to the difference between the voltage of the direct-current source and substantially the maximum tolerable voltage of the condenser divided by the continuous leakage current through the condenser when charged, whereby substantially the full charging capabilities of the condenser may be utilized despite the said poor voltage regulation characteristics, and means cooperative with the electric discharge device for causing the charged condenser to discharge its voltage through the electric discharge device.

2. The system of claim 1, wherein said discharge device is a flash lamp having a pair of principal electrodes, and wherein the last-mentioned means comprises a discharge circuit connecting the condenser between said electrodes.

3. The system of claim 2, wherein said discharge device has an auxiliary electrode, and wherein the last-mentioned means further comprises a triggering circuit connected to said auxiliary electrode for initiating the discharge of the charged condenser through the discharge circuit between the principal electrodes of the flash lamp, thereby to produce a flash of light.

References Cited in the file of this patent

UNITED STATES PATENTS 2,393,316    Edgerton -------------- Jan. 22, 1946